United States Patent [19]
Traverse

[11] 4,002,561
[45] Jan. 11, 1977

[54] METHOD AND APPARATUS FOR AEROBIC SEWAGE TREATMENT

[76] Inventor: Charles E. Traverse, Lake Waynewood, Lake Ariel, Pa. 18436

[22] Filed: Mar. 4, 1976

[21] Appl. No.: 663,799

Related U.S. Application Data

[63] Continuation-in-part of Ser. No. 525,656, Nov. 24, 1974, abandoned.

[52] U.S. Cl. .................................. 210/14; 210/15; 210/170; 210/205; 210/219; 210/220; 210/532 S; 261/87

[51] Int. Cl.² ...................... B01F 3/04; C02B 3/08; C02C 1/08

[58] Field of Search .................................. 210/4–7, 210/14, 15, 63 R, 138, 152, 170, 173, 194–197, 205, 219, 220, 221 R, 519, 532 S; 261/87; 415/88; 417/67, 76, 88, 199 A

[56] References Cited

UNITED STATES PATENTS

| 1,312,588 | 8/1919 | Skidmore, Jr. | 417/76 X |
| 1,734,011 | 10/1929 | Harrison | 210/14 X |
| 2,911,137 | 11/1959 | Edwards | 417/67 |
| 3,496,901 | 2/1970 | Stanfield et al. | 210/14 X |
| 3,662,890 | 5/1972 | Grimshaw | 210/15 X |
| 3,842,004 | 10/1974 | Nagahama | 210/221 X |
| 3,896,027 | 7/1975 | Digney et al. | 210/14 |
| 3,897,600 | 8/1975 | Burkholder | 210/15 X |

Primary Examiner—Charles N. Hart
Assistant Examiner—Robert H. Spitzer

[57] ABSTRACT

An aerobic sewage treatment method and apparatus for use with a conventional septic system collection tanks having an inlet conduit (baffle) and an outlet conduit (baffle). A separate treatment vessel is mounted horizontally above the septic tank, the vessel having tangential inlet and outlet at opposite ends; the inlet connected to the output of a pump immersed in the main tank with the outlet from the treatment vessel returning to the septic tank. The vessel contains baffle means to contact floc particles and means to inject an oxygen-containing gas into the liquid as the liquid flows through the vessel. Because of the configuration of the treatment vessel inlet and outlet and baffle means in the vessel, liquid in the vessel flows tangentially under conditions of hydraulic turbulence with large shear forces generated by the baffle means to reduce the floc particle size. Maximum aerobic treatment of the contaminated liquid is achieved by reducing the size of the floc particles in the presence of an oxygen-containing gas. A method and apparatus to prevent sludge bulking at the discharge baffle of the conventional septic tank are also disclosed.

20 Claims, 5 Drawing Figures

METHOD AND APPARATUS FOR AEROBIC SEWAGE TREATMENT

CROSS-REFERENCE TO RELATED APPLICATION

This application is a continuation-in-part of my U.S. Patent application Ser. No. 525,656 filed Nov. 24, 1974, now abandoned.

BACKGROUND OF THE INVENTION

This invention is in the field of sewage treatment equipment and is particularly directed to an aerobic sewage treatment unit having optimum aeration efficiency and being adaptable for converting an anaerobic sewage treatment unit to operate on the preferable aerobic process.

Septic systems employing the anaerobic process are widely used in areas not having public sewage disposal facilities. Generally, such systems consist of a sewage collection tank, usually referred to as a septic tank, in conjunction with a drain field into which effluent from the tank is discharged. Raw sewage normally flows by gravity into the septic tank where the solids gravitate to the bottom of the tank with liquid being discharged into the drain field to hopefully percolate downwardly into the surrounding soil.

The raw sewage received in septic tanks usually contain organic constituents including protein, carbohydrates and fats, oxygen activated organisms which function biochemically to decompose the organic constituents, and a limited natural supply of oxygen which activates the organisms to decompose the organic constituents. Initially in the biolysis of sewage deposited in the septic tank, urea, ammonia, and other products of the digestive putrefactive decomposition are partially oxidized so as to consume the limited amount of oxygen initially present in the raw sewage. Consequently, further decomposition of the sewage is by the anaerobic process. Continued putrefaction occurs under the anaerobic conditions so that the proteins are broken down to form urea, ammonia, foul-smelling mercaptans such as hydrogen sulfide and fatty and aromatic acids. Carbohydrates are broken down into their original fatty acid, water, carbon dioxide, hydrogen, methane and other substances. Fats and soaps are effected similarly to the hydrocarbon and are broken down to form the original acids of their constituency as well as carbon dioxide, hydrogen, methane and the like. Stable nitrides and nitrates are produced as the final product of the anaerobic decomposition process.

One substantial disadvantage of anaerobic sewage treatment is septic tanks is that there is an eventual accumulation of solid materials in the tank which must be periodically removed in order to avoid clogging of the drainfield and consequent discharge of raw sewage in the area of the tank. Additionally, the efficiency of a septic tank is largely dependent upon the soil conditions in which the drain field is located since the percolation of the soil is determinative of the size of the drain field and its consequent capacity for receiving and disposing of liquid effluent. In some areas, it is impossible to employ septic tanks due to the poor percolation characteristics of the soil.

The deficiencies of anaerobic process septic tanks have resulted in a substantial movement toward the usage of aerobic sewage treatment systems which also employ a receiving tank and a drain field but which additionally employ means for supplying oxygen to the sewage during its entire treatment process to provide a more complete decomposition than is normally obtainable in an anaerobic system. While the aerobic sewage treatment units that are commercially available have provided substantial advantages over the older anaerobic systems, they have suffered from a number of deficiencies from the standpoint of cost of manufacture, operation and maintenance which have slowed their acceptance as a substitute for the older anaerobic systems.

One of the more common problems with prior known commercial aerobic sewage treatment systems is that they fail to adequately dissipate the solid materials in the sewage and such materials consequently are discharged from the tank without full treatment. The discharge of solid materials into the drain field is highly undesirable since it can result in a blockage of the drain field within a relatively short time. In an effort to preclude the discharge of solid materials, some units have employed filters upstream of the outlet of the drain field. However, this approach has not proven to be satisfactory since the filters soon become clogged and must be replaced in order to remain effective.

Various other expedients have been employed in the prior known aerobic sewage treatment units such as aerators in the bottom of the main receiving tank, mechanical agitation devices, macerators and the like. Frequently, devices of the foregoing type have been overly complex and consequently prone to high expenses of initial manufacture as well as of maintenance. Other problems with prior known systems include failure to obtain optimum oxygenation in a rapid manner which necessitates the employment of a larger main tank than would be necessary if increased rates of oxygenation could be effected.

One example of a system proposed for incorporation into a septic tank system is disclosed in U.S. Pat. No. 3,662,890. Patentee proposes to withdraw liquid from the septic tank, treat it with air under pressure, and return the treated liquid to the septic tank. The patented system is completely hydraulic and relies on radially sparging of the air into the liquid. Pressure is maintained in the treatment vessel at all times by a gate valve in the discharge conduit.

SUMMARY OF THE INVENTION

In order to avoid the above-described problems and to provide an improved treating method and apparatus, it has been discovered that the contaminated liquid should be subjected to a micro-liquefaction process in the presence of an oxygen-containing gas. This is accomplished by causing the contaminated liquid, under conditions of hydraulic turbulence, to flow tangentially across a knife edge whereby great shear forces act on the floc particles to micro-liquefy the floc. An oxygen-containing gas injected at the knife edge optimizes oxygen transfer and, thus, aerobic treatment of the contaminated liquid. The invention includes apparatus for accomplishing micro-liquefaction in the presence of an oxygen-containing gas of contaminated liquids and sludges contained in prior art septic tanks or other collection vessels.

One embodiment of the invention is achieved through provision of an aerobic sewage treatment system including a main sewage collection tank having a sewage inlet and an effluent discharge opening as well as gas venting means. A closed treatment vessel (micro-liquefaction chamber) of cylindrical configuration is positioned externally of the main sewage collection tank for receiving sewage from the tank by operation of a pump positioned at a lower level near the bottom of the main tank. The pump comprises a hollow S-shaped contrifugal impeller, having sharp outer edges for providing a first size reduction of the solid (floc) particles fed to the pump by an axial inflow line extending downwardly to a bottom end termination adjacent to the lowermost portions of the main tank. A hollow drive shaft has an upper opening above the liquid level in the tank into which air flows and a discharge opening into the interior of the impeller so that air flows downwardly into the pump for mixing with the sewage when the pump is operated. The solids, dissolved gases and undissolved gases flowing from the pump are carried upwardly and forceably injected into the inlet of the treatment vessel (micro-liquefaction chamber).

The inlet of the treatment vessel or micro-liquefaction chamber is oriented tangentially with respect to the cylindrical chamber so that material injected into the chamber creates a vortex of rapidly swirling liquid and solids. The outlet of the micro-liquefaction chamber is also oriented tangentially with respect to the cylindrical chamber in the same manner as the inflow opening so as to permit the discharge of material from the compartment in a manner requiring no direction change of consequence such as would decrease the vorticity of the material within the chamber. Additionally, an inverted angle member having sharp edged surfaces extends axially within the treatment chamber and air is injected beneath the angle member. The swirling vortex of liquid containing solid (floc) particles is under conditions of hydraulic turbulence and the floc particles contacting the angle member are subjected to great shear forces so that they are micro-liquefied and provide optimum maximum molecular transfer of the oxygen in the air into solution with the liquid.

Therefore, it is the primary object of this invention to provide a new and improved sewage treatment system.

It is another object of the invention for the provision of a new and improved aerobic sewage treatment means.

It is yet another object of the subject invention for the provision of a new and improved aerobic sewage treatment system capable of micro-liquefaction and the resulting rapid molecular transfer of oxygen and nutrients into the waste to obtain optimum aerobic process.

It is still another object of the invention to provide a new and improved sludge-free sewage treatment system.

It is yet a further object of the present invention to provide a new and improved primary liquefaction pump for initially reducing the size of the solids and microorganisms and introducing an oxygen-bearing gas into the contaminated liquid.

It is still a further object of the invention to provide a new and improved aerobic sewage treatment method and apparatus that can be utilized in conjunction with any shape tank as a biological reactor.

DETAILED DESCRIPTION OF THE PREFERRED EMBODIMENT

Figure 1:
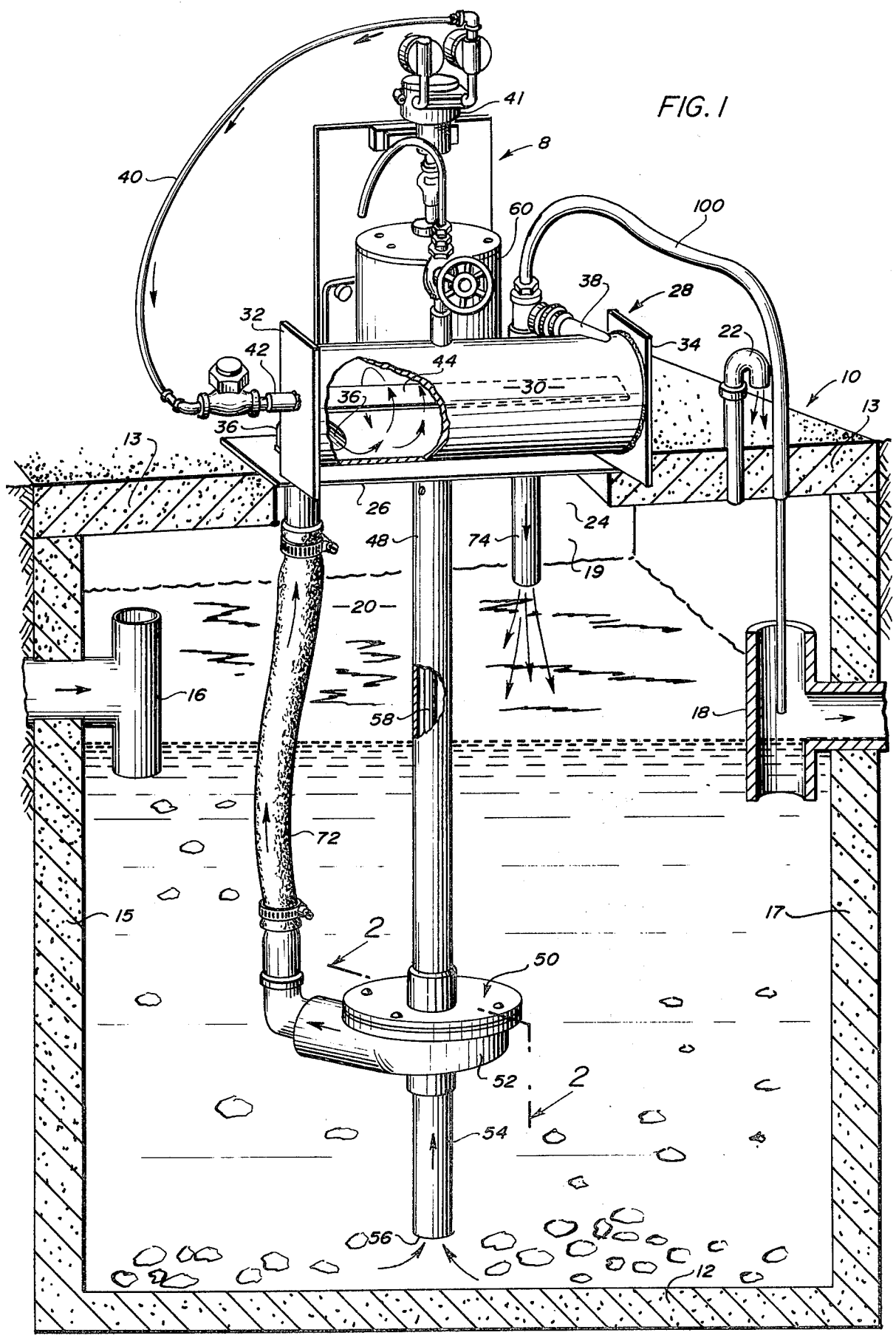
FIG. 1 is a partial perspective of the preferred embodiment mounted in a conventional septic tank with portions removed for purposes of illustration clarity.
Figure 2:
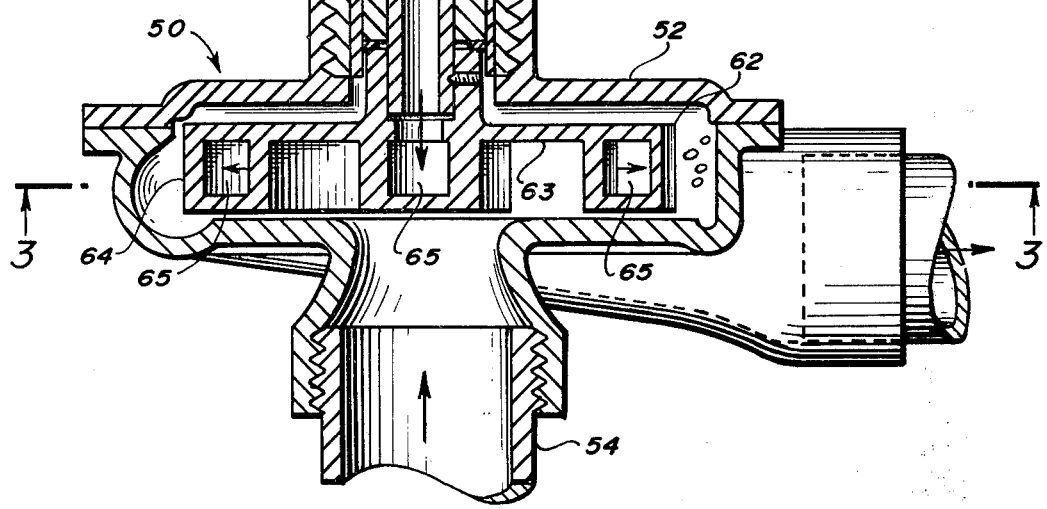
FIG. 2 is a sectional view taken along lines 2—2 of FIG. 1.

The present invention is designed to utilize any septic tank, without modifications (e.g. such as special compartments) as a biological reactor. This in itself is a radical departure from conventional sewage plants. A conventional extended aeration plant employs compartmented tanks, i.e. raw sewage drains into the first compartment where it is aerated, the mixed liquor flows from this compartment into a second settling compartment where the activated sludge solids settle to the bottom of the compartment and the clear liquor on the surface is discharged from the tank. The activated sludge solids that have accumulated on the bottom of the settling compartment are then pumped or otherwise directed back into the aeration compartment for further treatment usually at timed intervals.

The unique method and apparatus of the present invention produces a flotation that is so complete that there are no activated sludge solids on the bottom of the tank, and the digestion is accelerated to such an extent that only a single compartment tank is necessary.

The following definitions will explain the primary terms used in the specification and claims of the instant application.

Floc Particle and Eddy Film:

Examine sewage under a microscope and you will find it is composed of micro-organisms (bacteria). Each individual micro-organism or bacteria is called a floc particle which in turn is covered by a thin film of moisture called an eddy film.

Micro-Liquefaction:

The process of reducing the floc particle diameters and eddy film thickness of the micro-organisms present in the sewage into progressively smaller floc particle diameters and thinner eddy film thickness on a continual basis.

Aerobic Treatment:

When micro-liquefaction is effected in the presence of air, or some other oxygen-bearing medium, optimum molecular transfer of oxygen and nutrients into solution is produced at the supersaturation level.

The prior art processes of aerobic sewage treatment utilize at least a two compartment tank, the first or aeration compartment being supplied with ample nutrient (raw sewage) so that bacteria begins to grow to 10 times their average size in every dimension. The bacteria or floc particles multiply by self-dividing so one bacterium can multiply up to 5 trillion times in 1 day. With ample nutrient supply, bacteria (floc) bodies become light and fluffy so they do not settle in the water (sewage liquor). The oxygen environment in the first compartment promotes the growth of aerobes known as protozoa (amoeba, free swimming ciliata, and stalked ciliata) and rotifera which eat and digest the bacteria (floc). The fluffy bacteria particles flow over a weir into a second or settling compartment where no raw sewage enters so the bacteria are starved of nutrients, thus they cease to multiply and begin to contract by consuming a portion of their own bodies. Thus, the starved bacteria become heavier and settle to the bottom of the compartment where they are directed back into the aeration compartment for further digestion by the aerobes. A more detailed discussion of aerobic sewage treatment can be found in Volume I of *Treatment and Disposal of Wastewater from Homes by Soil Infiltration and Evapotranspiration*, by Dr. Alfred P. Bernhard, University of Toronto Press, 1973.

If aeration is attempted in a single compartment such as in conventional septic tanks, the light and fluffy bacteria (floc) continue to multiply, thus covering the surface of the liquid. This condition is called sludge bulking, which may eventually block the drain field because the rate of digestion of floc would be far less than the growth rate of the floc.

The unique micro-liquefaction process of the present invention makes it possible to physically reduce the bacteria (floc) into smaller and smaller particle sizes so they are readily digested by the aerobes (protozoa and rotifera). The process of the present invention causes rapid digestion of the bacteria (floc) so that it is constantly in a starved condition, thus settling to the bottom of the same compartment where they are aerated, thus eliminating the second or settling tank necessary for a conventional extended aeration process or plant. According to the present invention, the bacteria settling to the bottom of the single compartment biological reactor are continuously subjected to successive micro-liquefaction processes. A six-month testing program under laboratory conditions of the process of the present invention showed that micro-liquefaction can provide a virtually 100% sludge-free sewage treatment process.

The prior art does not disclose a method for micro-liquefaction of the floc particle and eddy film thickness of the micro-organisms present in the sewage. Examples of the prior art such as comminutors, macerators, mechanical agitating devices, aerators in the bottom of the main receiving tank, or in the case of U.S. Pat. No. 3,662,890, axial jets of air from a perforated internal sparger enclosed in a small auxiliary aeration chamber do not effectively result in the micro-liquefaction of the microorganisms present in the sewage. The prior art methods and apparatus effect, for comparison purposes, reduction of the solids to golf ball-size particles, as compared to the present invention which reduces such solids to the size approximately the head of a pin. The prior processes also do not benefit from the optimum oxygen transfer effected by micro-liquefaction. The present invention involves a unique method of micro-liquefaction employing mechanical forces combined with liquid tangential movement across knife edges and hydraulic turbulence to create great shear forces across the knife edges to produce efficient and complete micro-liquefaction. This is accomplished by employing liquid tangential flow across knife edges together with hydraulic turbulence in a unique treating vessel (micro-liquefaction chamber) which produces great shear forces across the knife edges. The turbulence is produced by forcibly injecting 30 GPM of liquid and 1.1 CFM of air or other oxygen-bearing medium into a chamber with a volumetric capacity of only 0.66 gallons.

FIG. 1 of the drawing illustrates the preferred embodiment of the invention, generally designated 8, as mounted on a conventional main sewage collection tank 10 which would normally be buried in the ground in an area as conveniently close to the facilities to be served by the unit as practical. Main tank 10 comprises a bottom wall 12, a top wall 13, an end wall 15 through which an inlet pipe 16 extends with the end of the inlet pipe being in the form of a sanitary tee member, and opposite end wall 17 with an outlet 18. Tank 10 also includes a front wall (not shown) and a rear wall 19. The interior of main tank 10 defines a sewage digestion chamber 20 with the solids gravitating downwardly to the bottom of the chamber as illustrated in FIG. 1. When the level of the liquid in the chamber 20 reaches the same height as the outlet 18, liquid effluent will be discharged to a drainage field to eventually percolate downwardly into the ground. A vent pipe 22 is provided in the top 13 of the main tank 10 for permitting the escape of gases from the chamber 20.

The preferred embodiment 8 of the subject invention is positioned over an opening 24 in the top 13 of the main tank 10 and includes a base plate 26 resting on the upper surface of the top 13 and completely overlying and covering the opening 24.

Figure 4:
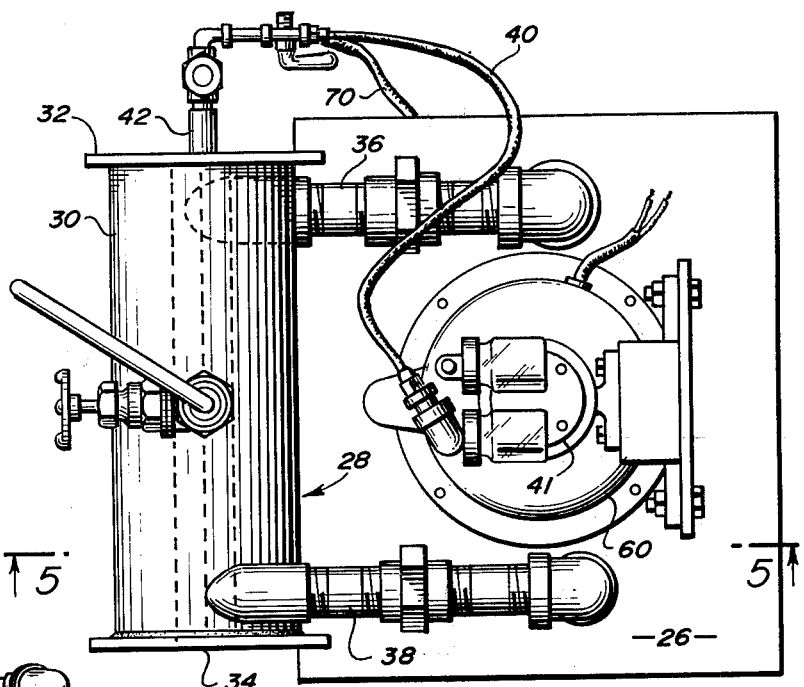
FIG. 4 is a top plan view.
Figure 5:
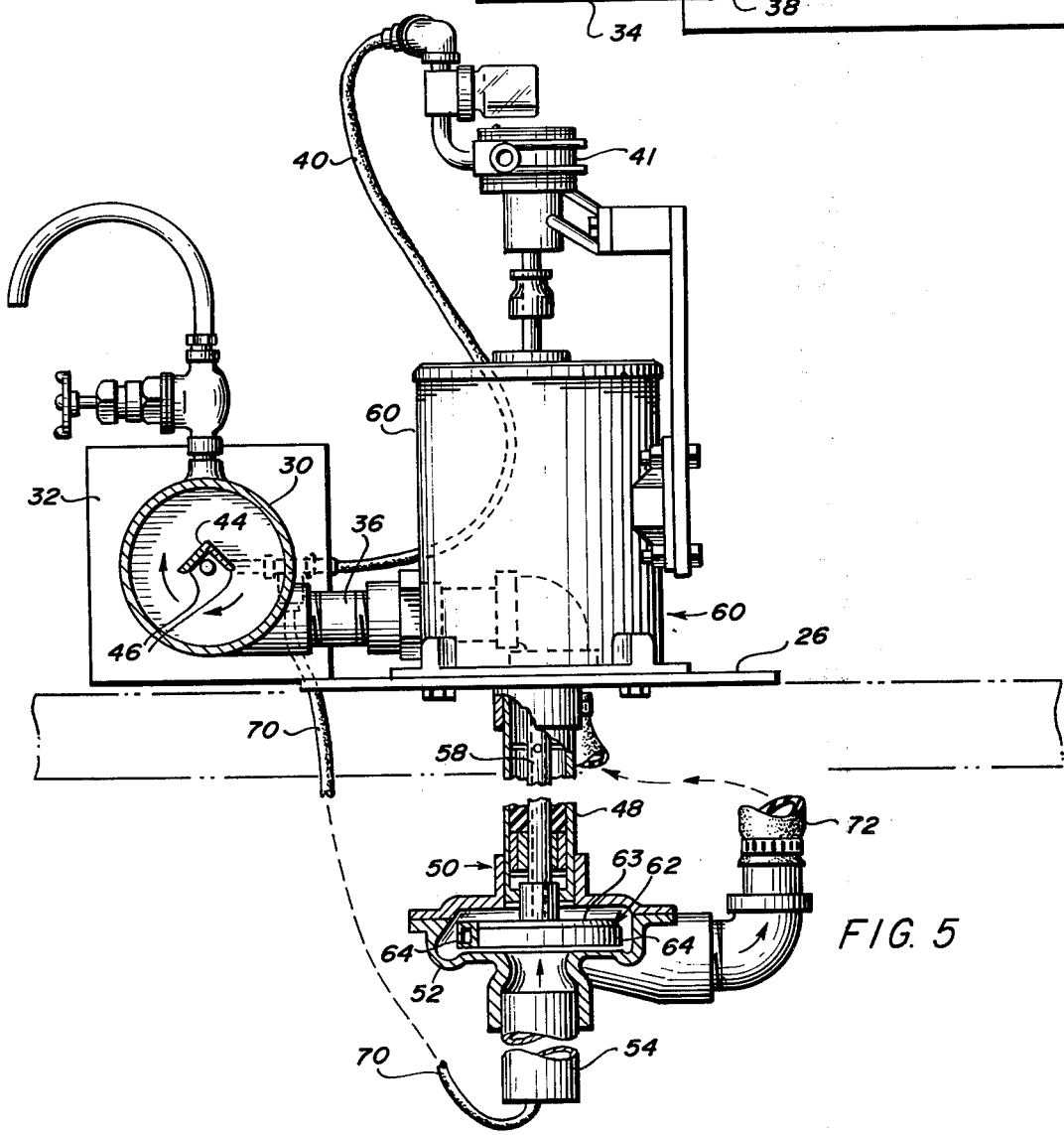
FIG. 5 is a sectional view taken along lines 5—5 of FIG. 4 and including an optional feature.

A treatment vessel (micro-liquefaction chamber) 28 consisting of a horizontal cylindrical portion 30 having its ends closed by end plates 32 and 34 is mounted on the base plate 26. End plates 32 and 34 which rest on the base plate 26 are normally welded or otherwise secured thereto. A tangential inflow conduit 36 is connected to the cylindrical portion 30 of vessel 28 adjacent to end wall 32 as best illustrated in FIGS. 1 and 5. Additionally, a tangential outflow conduit 38 is connected to the opposite end of the cylindrical portion 30 of vessel 28 adjacent to end plate 34. The inflow and outflow conduits 36 and 38 are oriented to provide a vortex flow between the inlet and outlet as illustrated by the arrows in FIG. 1 for the purpose of achieving optimum micro-liquefaction and the resulting molecular transfer of oxygen and nutrients of the materials passing through the cylindrical portion 30 of vessel 28 as will hereinafter be explained. A source of compressed air 40 from compressor 41 is connected to a fitting 42 in the end plate 32 positioned coaxially with respect to the cylindrical portion 30 of vessel 28 beneath a baffle 44 extending the length of the cylindrical portion 30. Baffle 44 comprises an inverted angle member having sharp edges 46 as shown in FIG. 5 with the inlet fitting 42 being positioned with respect to the baffle as best illustrated in FIG. 4. The swirling vortex of material on the interior of the cylindrical portion 30 causes the solids (floc) to engage the sharp edges 46 to provide intensified micro-liquefaction of the nutrients and, as the particles are reduced in size, molecular transfer of the oxygen injected via the fitting 42 with the pressure in the tank being at approximately 3.5 pounds per square inch is enhanced. The proximity between the sharp edges 46 of the baffle 44 and the inside wall of cylindrical portion 30 is such that large objects are thrown back into sharp edges 46 of the baffle many times before exiting out of vessel 28 through outflow conduit 38.

It should be clearly understood that the contaminated liquid flows tangentially under conditions of hydraulic turbulence causing very large shear forces to act on the floc particles reducing them in size and, thus, accomplishing the process called micro-liquefaction. Vessel 28 is not under pressure since the discharge conduit 38 is in no way valved or restricted.

A vertically oriented pump support sleeve 48 extends downwardly from the base plate 26 to provide support for a unique micro-liquefaction centrifugal pump 50 including a casing 52 from which an axial inflow conduit 54 extends downwardly to a lower end termination 56 as best illustrated in FIG. 1. Pump support sleeve 48 encloses a hollow tubular axial pump drive shaft 58 supported in roller bearings and having its upper end drivingly connected to an electric motor 60 which also drives the air compressor 41.

Figure 3:
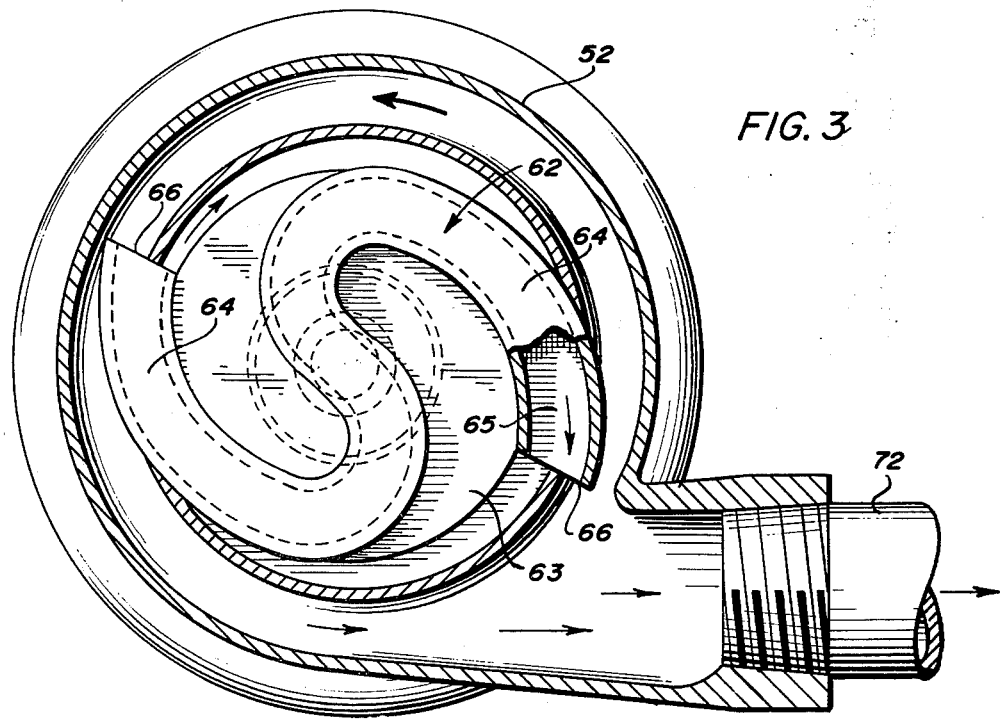
FIG. 3 is a sectional view taken along lines 3—3 of FIG. 2.

A pump impeller 62 is fixedly connected to the lower end of the hollow drive shaft 58 and includes a top plate 63 and an S-shaped downwardly extending hollow impeller blade 64 best illustrated in FIG. 3. Internal passageway 65 in the S-shaped impeller blade 64 is in communication with the lower end of the hollow tubular drive shaft 58 and the outer end of the passageway 65 and is defined by a sharp edge 66 best illustrated in FIG. 3. Air inflow opening 67 is provided in the support sleeve 48 and a second opening 67' is provided in the upper end of the hollow tubular drive shaft 58.

Impeller 62 is driven by the motor 60 in the direction of the large arrow in FIG. 3 so that the rotation of the impeller draws air downwardly through the openings 67 and 67' into the passageway 65 from which the air exits past the sharp edges 66. The movement of the impeller and the inflow of air provides an extreme amount of hydraulic turbulence and micro-liquefaction of the nutrients and molecular transfer of the oxygen ingested into the pump housing with the input flow being upwardly through inflow conduit 54 and then discharging outwardly through the outlet of the pump casing to an outlet line 72. It will be evident that the trailing edges 66 provide a primary micro-liquefaction of the solid particles flowing through the pump and the inflow of air through the impeller provides for optimum molecular transfer of the oxygen into solution with the liquid. The pump is designed to pass 30 GPM and ingest 2.9 CFM of air at the same time which is evidenced by an extreme pulsating discharge totally unique for a centrifugal-type pump.

The upper end of the outlet line 72 is connected to the tangential inflow conduit 36 of vessel 28 and the oxygenated discharge conduit 74 is connected to the outflow conduit 38 for discharging aerobically treated micro-liquefied sewage back into the main tank 10. The lower end of conduit 74 in the preferred embodiment terminates above the level of the liquid in tank 10.

In the operation of the embodiment, the electric motor 60 is actuated to drive the pump 50 and the compressor 41. Operation of the pump serves to pump primary liquefied sewage, dissolved and undissolved gases upwardly through the treatment vessel (micro-liquefaction chamber) 28 with air being injected into the chamber by means 40, 42 in a manner as discussed previously. The material passing through the cylindrical portion 30 of vessel 28 is given a whirling vortex motion due to the orientation of the tangential inlet 36 and the tangential outlet 38. It is of particular importance that the tangential outlet 38 is oriented so as to enhance the vortex flow through the cylindrical portion 30 of vessel 28 to the fullest extent possible. The vortex of the material on the interior of vessel 28 is rapidly moving past the sharp edges 46 of the baffle 44 to provide optimum reduction of the particle size of the floc, thus achieving liquefaction of the floc particles in accordance with the objects of the invention.

As the floc particles are reduced in size in the presence of an oxygen-containing gas present at the baffle surfaces, optimum oxygen transfer to the floc takes place.

FIG. 5 illustrates an optional feature comprising an air injection line 70 for providing additional compressed air to the inflow conduit 54.

The flow of the liquid and solid materials across the knife edges results in great shear forces and turbulence in the materials which mechanically and continually reduce the eddy film thickness and floc particle diameter of the micro-organisms present in the sewage. The production of increasingly thinner eddy film thickness and smaller particle diameters increases the transfer rate of oxygen and nutrients into the solution providing an optimum maximum dissolving of oxygen and nutrients into the sewage. The sewage, dissolved oxygen and nondissolved gases, primarily consisting of nitrogen, are then discharged from the micro-liquefaction chamber by the conduit 74. The oxygenated sewage is consequently returned to the main tank 10 in which the dissolved gas and nutrients are mixed with sewage in the digestion chamber 20 to undergo aerobic treatment. Undissolved gases are vented by the vent pipe 22 into the atmosphere. Continuous inflow of raw sewage into the tank results in an eventual outflow of treated sewage from the outlet 18 in an obvious manner.

It was observed during the six-month test program that the suspended solids content of the biological reactor (septic tank) employing the method and apparatus of the invention were consistently lower than that of the effluent discharging when the tank was operating in a conventional septic system.

The lack of circulation of the liquid effluent in discharge baffle 18 of tank 10 permits bacteria in the baffle 18 to grow light and fluffy and float on the surface of the liquid. Due to this sludge bulking, it becomes necessary to divert a small quantity of the discharge of the micro-liquefaction chamber 28 to the discharge baffle 18, thus maintaining a bacteria starved condition in the baffle so the floc settles to the bottom of tank 10. In order to accomplish this, an auxiliary conduit (or wash-out line) 100 is fitted between the discharge 38 of chamber 28 and the discharge baffle (sanitary tee) 18 of tank 10. This conduit 100 diverts a portion of the micro-liquefied sewage having a high dissolved oxygen (D.O.) content low $B.O.D._5$ and suspended solids content to the baffle 18 so that the floc contained therein is caused to fall to the bottom of tank 10 by the same starvation process that causes settling of the floc in the main portion of tank 10.

Comparison tests were made of the effluent in baffle 18 of tank 10 with and without micro-liquefied sewage flowing through conduit 100. With micro-liquefied sewage flowing through conduit 100, the tests showed no sludge bulking and a fifty (50%) percent decrease in suspended solids in the liquid in the baffle.

Another object of the invention is realized by the provision of automatic venting means from the micro-liquefaction chamber induced by directing the discharge conduit 74 from the vessel 28 downwardly so it terminates in the air space above the liquid level in the tank 10. The liquid, dissolved gases, and undissolved gases all pass through the conduit 74. The liquid and dissolved gases drop into the tank for aerobic process, while the undissolved gases, mostly nitrogen, pass to atmosphere through the tank venting conduit or pipe 22. Thus, the treatment vessel or micro-liquefaction chamber 28 is self-venting.

Maximum biolysis of the sewage occurs by virtue of several construction features employed in both embodiments of the invention. Specifically, the premixing of the sewage with air in the unique micro-liquefaction pump 50 serves to enhance the cutting operation of the impeller on solid particles as well as to oxygenate the sewage. The whirling vortex of material in the cylindrical tank 30 past the sharp edges 46 of baffle 44 provides additional particle size reduction and oxygenation. Moreover, it has been found that the effluent discharged from the outlet 18 contains sufficient oxygen to continue the oxygenation process in the drain field.

In the biolysis of sewage in septic systems as previously discussed, the digestive process is conducted only for a short period of time under aerobic conditions until the supply of natural oxygen is consumed. After the natural oxygen has been consumed, the treatment process becomes an anaerobic process which eventually results in a low biochemical oxygen demand reduction (B.O.D.) in the order of 30 percent. The superiority of the subject invention over such prior known systems is evidenced by the fact that the biological oxygen demand of the effluent from the subject invention is of the order of 95 percent and is both odorless and clear.

It is contemplated that the subject invention can be manufactured and employed as a new installation or that it can be installed on an existing septic tank for the purpose of converting to an aerobic sewage treatment process. The system provides substantial advantages due to the high quality of the effluent and does not require as substantial a drain field as is necessary with other type systems.

It is understood that the subject invention is susceptible to numerous modifications and adaptions that will be obvious to those of skill in the art.

Having thus described my invention, what I desire to secure as my invention by Letters Patent of the United States is set forth in the appended claims.

I claim:

1. In a septic tank system for collecting and treating contaminated liquids such as domestic sewage, the improvement which comprises in combination:
    means for simultaneously withdrawing a portion of the contaminated liquid from said tank and reducing the size of floc particles contained therein;
    means for introducing the contaminated liquid into an elongated generally cylindrical treatment vessel, said vessel containing a tangential inlet on one end and a tangential outlet on the other end to cause the liquid to circulate around the circumference of said vessel and along its axis, thus creating hydraulic turbulence in said fluid;
    said vessel having therein surface means to contact and reduce said floc particles in size by mechanical shear forces; and
    means to introduce an oxygen-containing gas into said liquid in said vessel; whereby said floc particles are subjected to optimum size reduction and optimum transfer of oxygen to maximize aerobic treatment of the contaminated liquid.

2. A system according to claim 1 including means to return said treated liquid to said septic tank.

3. A system according to claim 1 wherein the means for contacting said floc particles includes a knife edge disposed longitudinally in said treatment vessel.

4. A system according to claim 1 wherein said means for introducing an oxygen-containing gas into said vessel is disposed adjacent said inlet.

5. A system according to claim 1 wherein said means for withdrawing said liquid from said septic tank includes a centrifugal pump including a housing and an impeller in said housing, said impeller having sharpened leading and trailing edges to reduce floc particles on contact by mechanical shear forces.

6. A system according to claim 1 wherein said means to introduce an oxygen-containing gas into said liquid in said treatment vessel includes an air compressor and a conduit between the discharge of said compressor and said vessel.

7. A system according to claim 1 wherein said means to introduce an oxygen-containing gas into said liquid includes a baffle extending substantially the length of said cylinder with an oxygen-containing gas inlet disposed underneath said baffle to conduct said gas along the length of said baffle.

8. A system according to claim 2 including means to direct a portion of the treated liquid to an outlet baffle of said septic tank.

9. A system according to claim 7 wherein said baffle is an angle member having an inverted V-shaped cross section with the outer edges of said member being sharpened.

10. An aerobic sewage treatment system comprising in combination:
    a main sewage collection tank having a raw sewage inlet and an effluent discharge outlet;
    a closed cylindrical treatment vessel for treating said sewage by micro-liquefaction of floc particles contained in said sewage;
    said treatment vessel having a tangential sewage inlet at one end thereof and a tangential outlet at the opposite end thereof;
    a baffle disposed axially within said vessel, said baffle presenting at least one edge to contact and reduce said floc particles in size by mechanical shear forces;
    means to introduce an oxygen-containing gas into said vessel below said baffle so that said baffle acts to distribute said oxygen-containing gas throughout said vessel;
    means for conducting sewage deposited in said main collection tank to said inlet of said vessel, said conducting means including a conduit between said vessel inlet and a centrifugal pump disposed in said sewage in said main tank, said pump including a housing and an impeller in said housing, said impeller having blades with sharp edge portions to contact and reduce the size of said floc particles before entering said vessel;
    whereby said pump forces said sewage through said vessel and induces hydraulic turbulence in said fluid in said vessel so that the floc particles in said liquid are further reduced in size by contacting said baffle as said liquid flows through said vessel and said oxygen-containing gas is introduced into said liquid to effect maximum aerobic treatment of said contaminated liquid.

11. A system according to claim 10 including means to discharge effluent from the treatment vessel into said main sewage collection tank above the level of liquid contained therein.

12. A system according to claim 10 wherein said baffle comprises an angle member having an inverted V-shaped cross section with sharp outer edge portions.

13. A system according to claim 10 including means to divert a portion of the effluent from said treatment vessel to the effluent discharge outlet of the main sewage collection tank.

14. An aerobic sewage treatment apparatus adapted for use with a sewage collection tank having a top opening, a raw sewage inlet and an effluent discharge outlet, said apparatus comprising:

support means supportably positionable on said tank overlying said top opening and including a downwardly extending vertical support extendable downwardly through said top opening to have its lower extent below said discharge outlet;

a closed cylindrical intensified micro-liquefaction tank positioned on said support means, said closed cylindrical intensified micro-liquefaction tank having a tangential sewage inlet at one end of said cylindrical tank;

a centrifugal pump mounted on the lower extent of said vertical support so that said pump is positionable below the surface of sewage in said collection tank, wherein said centrifugal pump includes a hollow impeller blade having an internal passageway extending along its entire length, a hollow driveshaft connected at its lower end to said impeller blade and having an internal passageway in communication with a central portion of an S-shaped hollow impeller blade, said impeller blade is provided with sharp trailing edge portions adjacent the ends of said hollow passageway extending through said hollow impeller blade;

means for injecting a gas including oxygen under pressure into said cylindrical intensified micro-liquefaction tank, said means for injecting a gas including oxygen into said cylindrical intensified micro-liquefaction tank includes an air compressor and conduit means connected between said air compressor and an axial portion of said cylindrical intensified micro-liquefaction tank;

an axially positioned baffle means disposed within said cylindrical intensified micro-liquefaction tank for guiding air injected into said cylindrical intensified micro-liquefaction tank along the axis of said cylindrical intensified micro-liquefaction tank for mixing with a vortex of liquid and solid particles passing through said cylindrical intensified micro-liquefaction tank; and means for conducting undissolved gases, dissolved gases and sewage from a tangential outlet in said cylindrical intensified micro-liquefaction tank to discharge below said support means to enable return of same to a collection tank.

15. The aerobic sewage treatment invention of claim 14 including means for conducting a portion of output from the outlet of said micro-liquefaction tank to the effluent discharge outlet of said sewage tank.

16. The aerobic sewage treatment invention of claim 14 wherein said baffle means for guiding said air injected into said cylindrical intensified micro-liquefaction tank comprises an angle member having an inverted V-shaped cross-sectional configuration with sharp outer edge portions.

17. A method of treating a contaminated liquid such as domestic sewage normally discharged into a septic tank comprising the steps of:

continuously withdrawing a portion of the contaminated liquid from the septic tank;

injecting the withdrawn liquid into a closed treating vessel having therein surface means to contact floc particles contained in the liquid;

causing said liquid to flow tangentially through said vessel under conditions of hydraulic turbulence so that said floc particles are subjected to shear forces by moving across said contacting means in said vessel; and simultaneously injecting an oxygen-containing gas into said vessel; whereby said portion of the contaminated liquid in said vessel is given a maximum aerobic treatment of micro-liquefaction of the floc particles in the contaminated liquid and returning said treated portion of said contaminated liquid to said septic tank.

18. A process according to claim 17 wherein a portion of the contaminated liquid is continuously withdrawn from the septic tank and the micro-liquefied treated liquid is returned to the tank above the level of the contaminated liquid.

19. A method according to claim 17 wherein as said contaminated liquid is withdrawn from the septic tank, the floc particles contained therein are subjected to a first size reduction prior to being injected into said treating vessel.

20. A method according to claim 18 wherein a portion of the micro-liquefied treated liquid is returned to the discharge outlet of the septic tank.

* * * * *